(12) United States Patent
Sellers

(10) Patent No.: US 8,327,576 B2
(45) Date of Patent: Dec. 11, 2012

(54) FLOATING FISHING TACKLE BOX AND METHOD OF MAKING SAME

(76) Inventor: Curtis Sellers, Round Rock, TX (US)

( * ) Notice: Subject to any disclaimer, the term of this patent is extended or adjusted under 35 U.S.C. 154(b) by 443 days.

(21) Appl. No.: 12/592,485

(22) Filed: Nov. 25, 2009

(65) Prior Publication Data

US 2011/0119986 A1    May 26, 2011

(51) Int. Cl.
*A01K 97/04* (2006.01)
(52) U.S. Cl. ......................... 43/54.1; 220/560
(58) Field of Classification Search .......... 43/54.1–57.3; 206/315.11; 220/560
See application file for complete search history.

(56) References Cited

U.S. PATENT DOCUMENTS

| | | | |
|---|---|---|---|
| 417,979 A * | 12/1889 | Borcherdt | 43/57.1 |
| 1,942,756 A * | 1/1934 | Howard | 43/56 |
| 2,597,567 A * | 5/1952 | Como | 220/8 |
| 2,598,995 A * | 6/1952 | Graff | 126/375.1 |
| 2,641,520 A * | 6/1953 | Moore | 312/291 |
| 2,811,276 A * | 10/1957 | Ray | 220/560 |
| 3,197,915 A | 8/1965 | Staver | |
| 3,512,295 A | 5/1970 | Barge | |
| 3,780,468 A | 12/1973 | Maffett | |
| 3,889,805 A | 6/1975 | Korten | |
| 4,020,584 A | 5/1977 | Michal | |
| 4,208,826 A | 6/1980 | Lindaman | |
| 4,697,380 A * | 10/1987 | Fenske | 43/55 |
| 4,784,304 A * | 11/1988 | Schweitzer | 224/610 |
| 4,829,699 A | 5/1989 | Perkins | |
| 5,163,694 A | 11/1992 | Reichek | |
| 6,014,833 A | 1/2000 | Benavidez | |
| 6,269,587 B1 | 8/2001 | Wallace | |
| 6,405,478 B1 | 6/2002 | Westley | |
| 6,527,113 B2 | 3/2003 | Blake | |
| 6,857,222 B1 * | 2/2005 | King | 43/56 |

\* cited by examiner

*Primary Examiner* — Kimberly Berona
*Assistant Examiner* — Danielle Clerkley
(74) *Attorney, Agent, or Firm* — David O. Simmons

(57) ABSTRACT

A container includes a container body, a body insert, a seal structure, and a cover. The container body has a cavity therein defined by a closed lower end portion thereof and an open upper end portion thereof. The body insert is within the cavity. At least a portion of a bottom wall of the body insert is spaced away from an interior surface of the container body defining the closed lower end portion thereof. The seal structure is between the body insert and the container body such that a sealed gas chamber is defined within the cavity between the container body and the body insert. The cover is movably attached to at least one of the container body and the body insert in a manner allowing the cover to be moved between a position covering the cavity and a position allowing access into the cavity.

20 Claims, 5 Drawing Sheets

FLOATING FISHING TACKLE BOX AND METHOD OF MAKING SAME

FIELD OF THE DISCLOSURE

The disclosures made herein relate generally to fishing tackle boxes and other similar containers and, more particularly, to fishing tackle boxes that are configured for floating on water.

BACKGROUND

Many devices are known whose purpose is to function as a tackle box and contain the myriad of different flies, lures and other tackle popular with the avid fisherman. Fisherman of today commonly own hundreds of these different baits, each with its own particular appeal to a fisherman. The fisherman commonly employs a very large tackle box containing enumerable compartments or trays containing these various lures (i.e., a conventional fishing tackle box). Because of its size, weight and associated lack of buoyancy, such a conventional fishing tackle box is usually placed at the shore and the fisherman removes therefrom his individually selected lures of the day and takes these with him as he wades into the water.

As any fisherman well knows, on any given fishing day, a particular lure will typically produce strikes whereas other lures, even very similar to that particular lure, will not. As such, a fisherman will often have to try not only different types and styles of lures, but also different colors of a particular type and style. This type of trial and error approach to selecting a lure that will produce strikes requires that a fisherman have ready access to a multitude of different lures.

For the fisherman that is wading, carrying a multitude of different lures can present challenges. One challenge is that there is limited space on the fisherman's body to carry lures. Another challenge is that, even though fishing lures are generally resistant to corrosion, water that leaks into a non-sealed tackle box during wading can result in corrosion of lures if the water is not removed from within the tackle box prior to storage. Still another challenge is that lures must be readily accessible to the fisherman so that they can be changed in a simple, timely, and convenient manner. To overcome such challenges, solutions have included carrying lures in containers mounted on the upper body of the fisherman, carrying lures on a floating tackle caddy, and carrying lures in a floating tackle box. However, these solutions are not without shortcomings. Carrying lures in containers mounted on the upper body of the fisherman (e.g., in pockets of a vest) can be limit mobility of a fisherman, make accessing of lures difficult, and allow water to get inside of the tackle boxes. Known floating tackle boxes are susceptible to taking on water if submerged or splashed on contributing to the possibility of corrosion of lures therein, or may sink and be lost. Furthermore, the overall design of known floating tackle boxes can make it difficult and/or time-consuming to retrieve lures threrefrom and/or store lures therein while the tackle box is floating on the water or while manually holding the tackle box out of the water.

There is, therefore, a need for a tackle box that has buoyancy properties allowing it float while a fisherman is wading, that is configured such that lures and/or bait can be easily and readily retrieved while the tackle box is floating on the water, that is sealed against intrusion by water when a lid thereof is in a closed position, and that can be manufactured in a relatively simple manner.

SUMMARY OF THE DISCLOSURE

Embodiments of the present invention are directed to a container such as a fishing tackle box that has buoyancy properties allowing it float while a fisherman is wading, that is configured such that lures and/or bait can be easily and readily retrieved while the tackle box is floating on the water, that can be sealed against intrusion by water when a lid thereof is in a closed position, and that can be manufactured in a relatively simple manner. Embodiments of the present invention use a seal structure for creating a sealed gas chamber (e.g., air-filled chamber) in a container (e.g., a fishing tackle box) that provides sufficient buoyancy for allowing the container to float on water when laden with an intended volume and/or weight of articles (e.g., fishing tackle). In this manner, embodiments of the present invention provide advantageous and useful functionality.

In one embodiment of the present invention, a container comprises a container body, a body insert, a seal structure, and a cover. The container body has a cavity therein defined by a closed lower end portion thereof and an open upper end portion thereof. The body insert is within the cavity. At least a portion of a bottom wall of the body insert is spaced away from an interior surface of the container body defining the closed lower end portion thereof. The seal structure is between the body insert and the container body such that a sealed gas chamber is defined within the cavity between the container body and the body insert. The cover is movably attached to at least one of the container body and the body insert in a manner allowing the cover to be moved between a position covering the cavity and a position allowing access into the cavity.

In another embodiment of the present invention, a fishing tackle box comprises a container body, a body insert, a seal structure, and a cover. The container body has a cavity therein defined by a closed lower end portion thereof and an open upper end portion thereof. The container body includes at least one strap attachment structure integral with an exterior surface thereof. The body insert, which is within the cavity, has a compartment structure and a standoff structure. An upper end portion of the compartment structure is adjacent the open upper end portion of the container body. The standoff structure extends from the compartment structure toward the closed lower end portion of the container body. The compartment structure includes a plurality of compartments accessible through the open upper end portion of the container body. The seal structure is between the compartment structure and the container body such that a sealed gas chamber is defined within the cavity between the container body and the body insert. The cover is moveably attached to at least one of the container body and the body insert in a manner allowing the cover to be moved between a position covering the cavity and a position allowing access into the cavity.

In another embodiment of the present invention, a method of making a container comprises an operation for positioning a body insert within a cavity of a container body. A closed lower end portion of the container body and an open upper end portion of the container body jointly define the cavity. The container body has at least one strap attachment structure integral with an exterior surface thereof. After, during, or in conjunction with positioning the body insert within the cavity, an operation is performed for providing a seal structure between the body insert and the container body such that a sealed gas chamber is defined within the cavity between the container body and the body insert. The method also includes an operation for movably attaching a cover to at least one of the container body and the body insert in a manner allowing the cover to be moved between a position covering the cavity and a position allowing access into the cavity.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
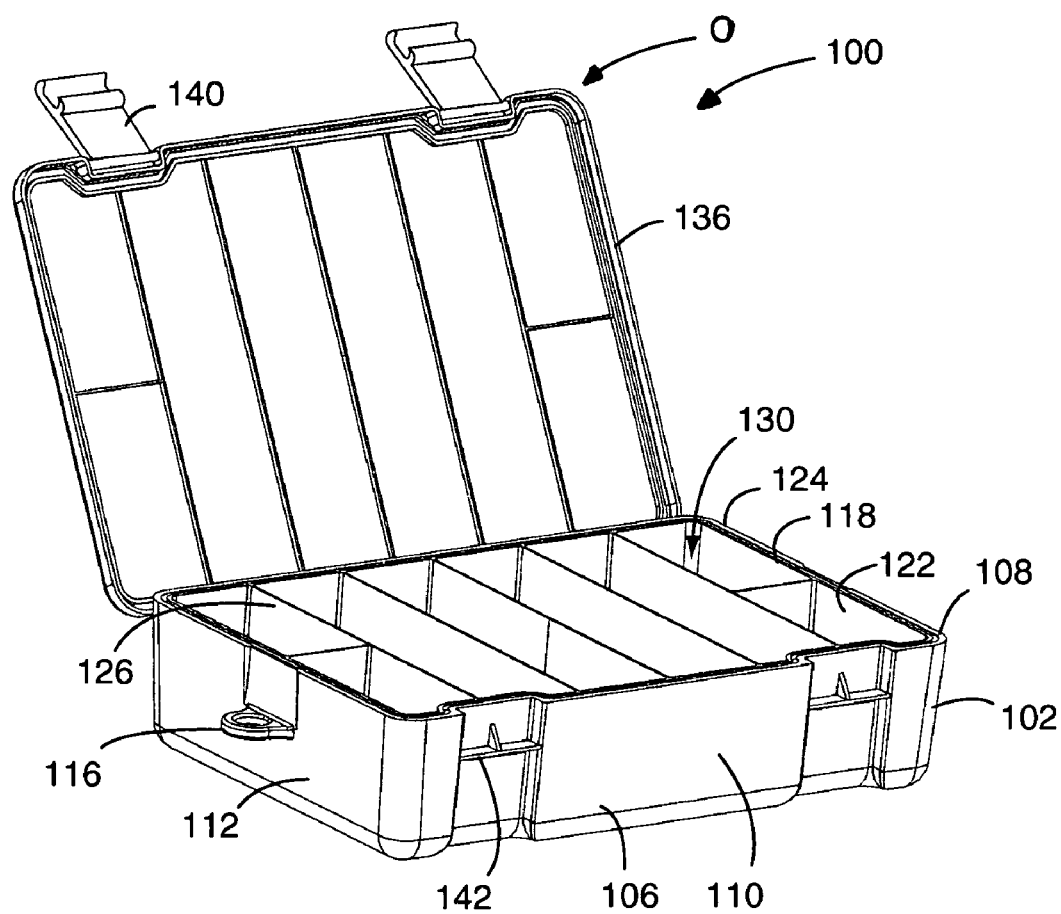
FIG. 1 is a front perspective view of a tackle box configured in accordance with the present invention, wherein a cover of the tackle box is in an open position.
Figure 2:
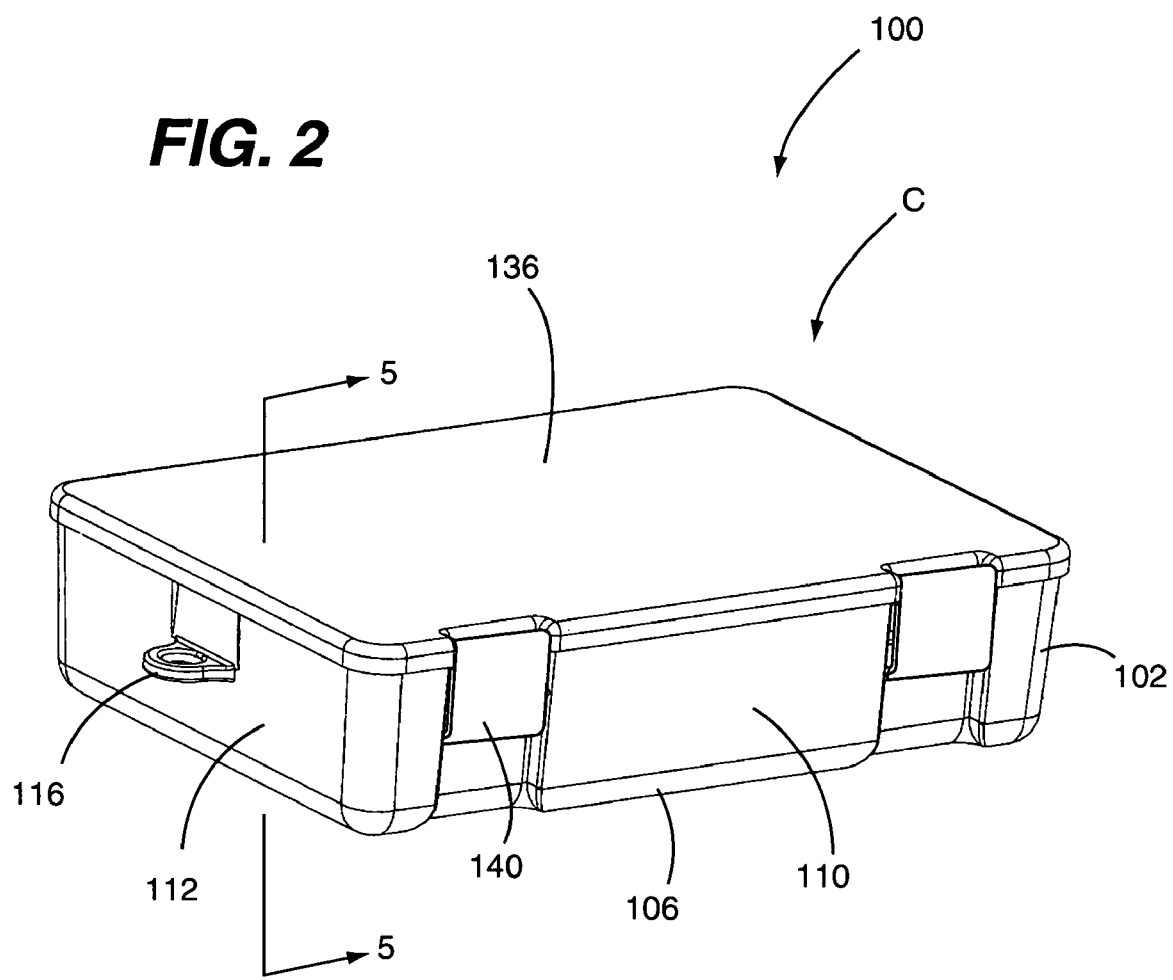
FIG. 2 is a front perspective view of the tackle box of FIG. 1, wherein the cover of the tackle box is in a closed position.
Figure 3:
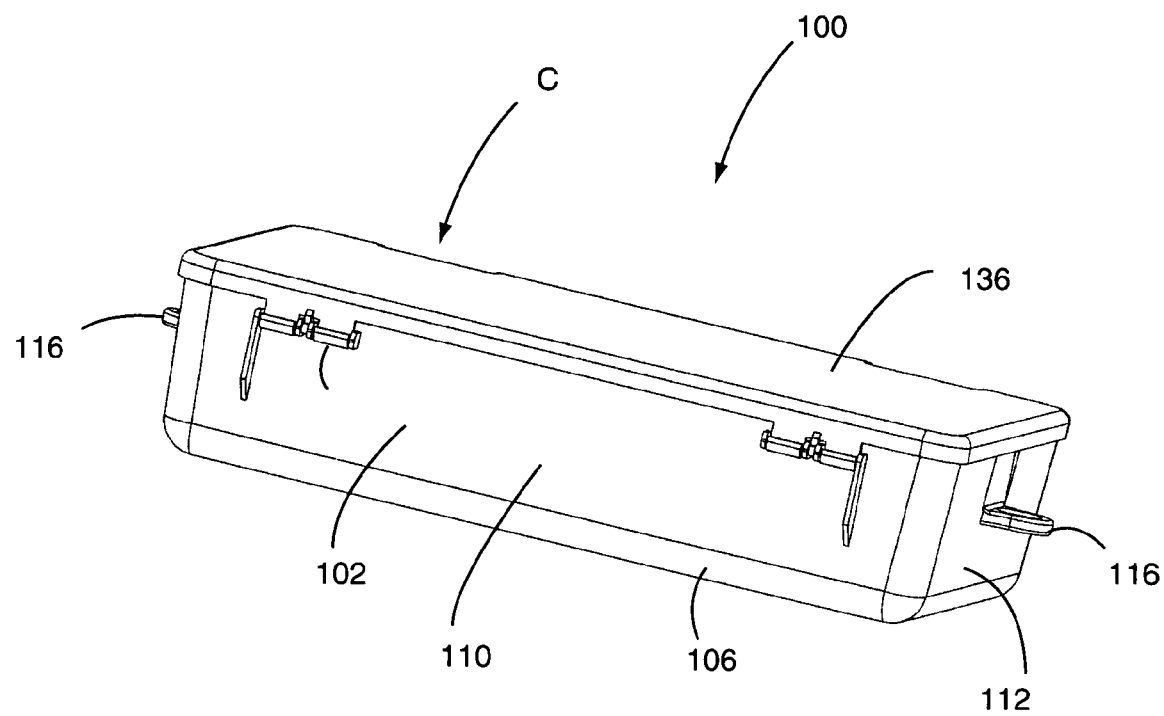
FIG. 3 is a rear perspective view of the tackle box of FIG. 1, wherein the cover of the tackle box is in the closed position.
Figure 4:
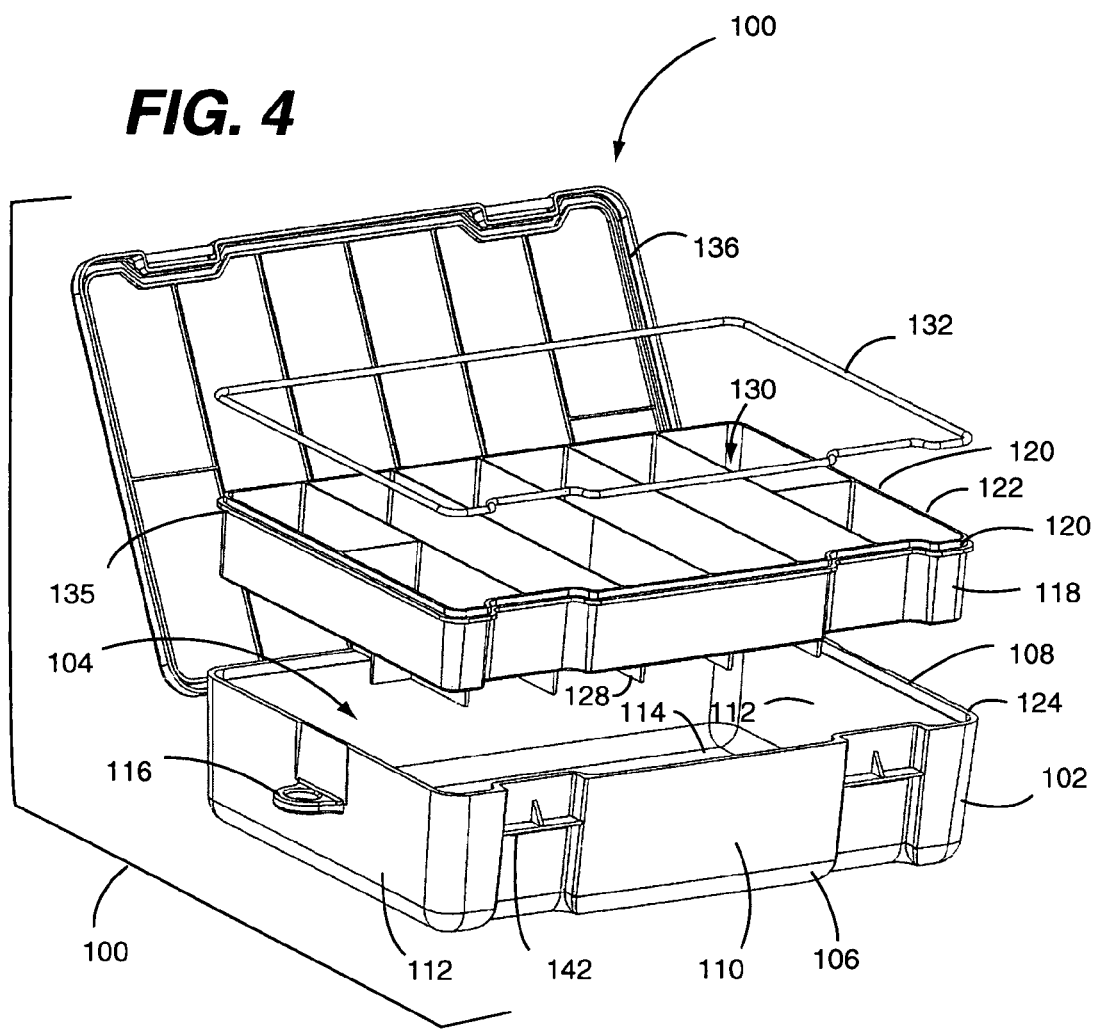
FIG. 4 is an exploded view of the tackle box of FIG. 1.
Figure 5:
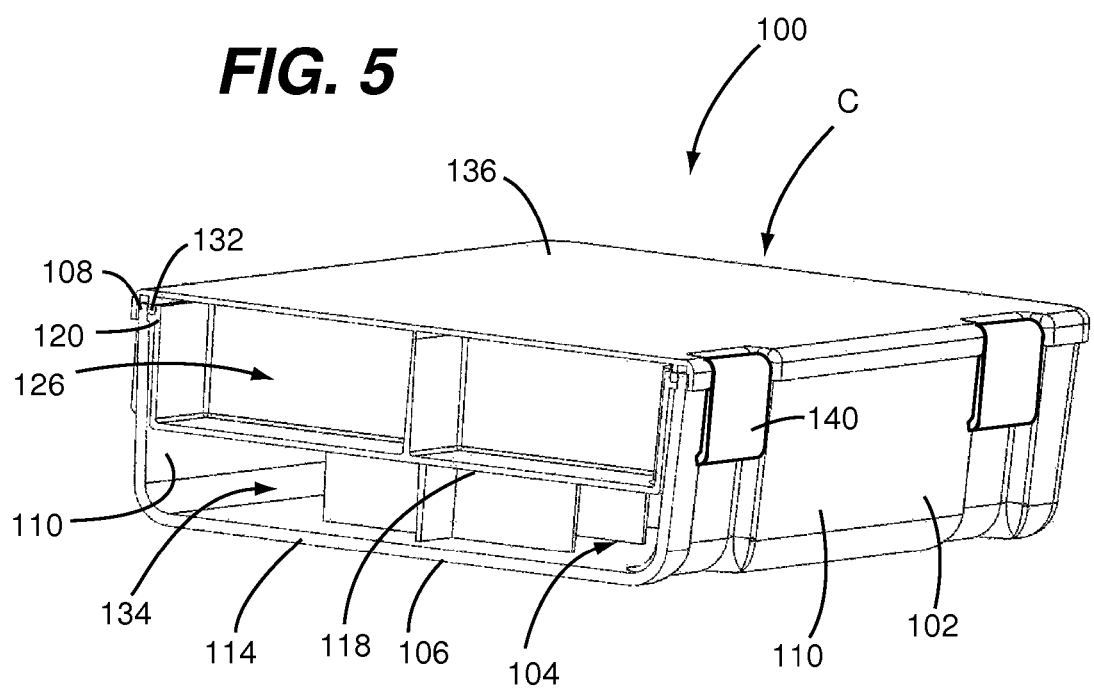
FIG. 5 is a cross-sectional view taken along the line 5-5 in FIG. 2.
Figure 6:
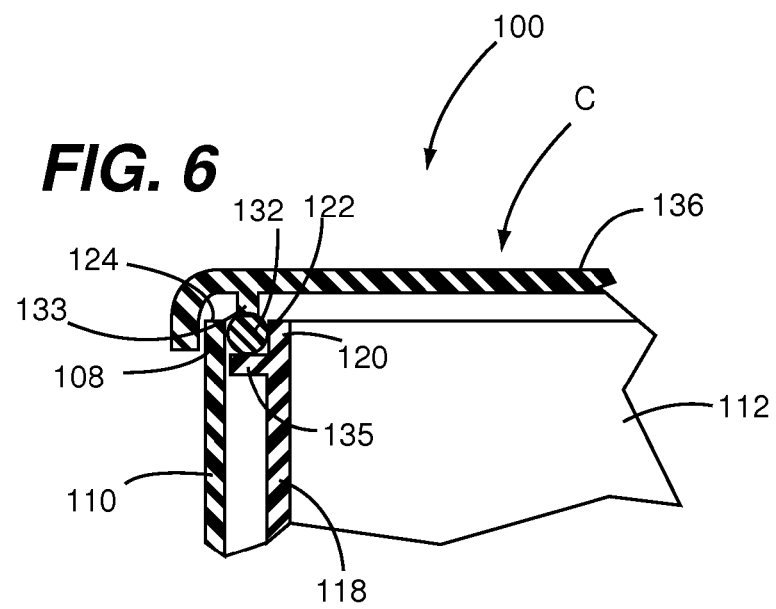
FIG. 6 is a detail view showing a sealing structure, container body, body insert and cover of the tackle box of FIG. 1.

FIGS. 1-6 show various aspects of a tackle box 100 configured in accordance with an embodiment of the present invention. The tackle box 100 is configured in a manner that provides buoyancy properties allowing it float while a fisherman is wading, that is configured such that lures and/or bait can be easily and readily retrieved while the tackle box is floating on the water, that can be sealed against intrusion by water when a lid thereof is in a closed position, and that can be manufactured in a relatively simple manner. The tackle box 100 includes a buoyancy-providing structure that provides sufficient buoyancy for allowing the tackle box 100 to float on water when laden with an intended volume and/or weight of articles (e.g., fishing tackle). In this manner, the fishing tackle box 100 provides advantageous and useful functionality.

In view of the disclosures made herein, a skilled person will appreciate that the fishing tackle box 100 is one example of a container configured in accordance with the present invention. Thus, it is disclosed herein that a container configured in accordance with the present invention is not unnecessarily limited to any particular type of use or application. It is also disclosed herein that a container configured in accordance with the present invention can be used for applications that require floating (i.e., buoyancy) functionality and/or those that do not.

A container body 102 of the fishing tackle box 100 has a cavity 104 therein defined by a closed lower end portion 106 of the container body 102 and an open upper end portion 108 of the container body 102. Opposing sidewalls 110, opposing end walls 112, and bottom wall 114 are interconnected in a manner forming the closed lower end portion 106 of the container body 102 and an open upper end portion 108 of the container body 102. Although a generally rectangular shape is preferred for the container body 102, the container body 102 is not unnecessarily limited to being any particular shape.

Attachment structures 116 integral with an exterior surface of the container body 102 thereby allowing a tethering device (not shown) to be attached to the container body 102. Such a tethering device can serve as a shoulder strap, a leash, or both and can have end portions each attached to one of the attachment structures 116 in a detachable manner. Preferably, but not necessarily, a first one of the attachment structures 116 is integral with a first one of the opposing end walls 112 and a second one of the attachment structures 116 is integral with a second one of the opposing end walls 112.

A body insert 118 is disposed within the cavity 104. An upper end portion 120 of the body insert 118 is adjacent the open upper end portion 104 of the container body 102. In at least one embodiment of the present invention, an upper edge 122 of the body insert 118 is substantially flush with an upper edge 124 of the container body 102.

The body insert 118 has a compartment structure 126 and a standoff structure 128 attached to the compartment structure 126. The compartment structure 126 includes a plurality of compartments 130 accessible through the open upper end portion 108 of the container body. An upper edge of the compartment structure 118 (e.g., the upper edge 122 of the body insert 118) can be adjacent (e.g., flush with) an upper edge of the container body 102 (e.g., upper edge 124 of the container body 102). The standoff structure 128 extends from the compartment structure 126 toward the closed lower end portion 106 of the container body 102. It is disclosed herein that the compartment structure 126, the standoff structure 128, and the container body 102 can be jointly configured such that the standoff structure 128 is spaced away from the bottom wall 114 of the container body 102 or in contact with the bottom wall 114 of the container body 102. It is also disclosed herein that the standoff structure 128 can be omitted, as can be the plurality of compartments 130 (e.g., body insert 118 has a single compartment defined by sidewalls, end walls and bottom wall thereof).

A seal structure 132 is between the compartment structure 130 and the container body 102 such that a buoyancy chamber 134 is defined within the cavity 104 between the container body 102 and the body insert 118. In one embodiment, the buoyancy chamber 134 is a sealed gas chamber containing no other buoyancy providing substance but a gas such as air. However, it is disclosed herein that a material such as buoyant foam (e.g., suitably configured closed cell foam) can be provided within the buoyancy chamber 134, in which case the buoyant foam can occupy essentially all or only a portion of the buoyancy chamber 134.

The underlying function of the sealing structure 132 is to form a suitable seal between the container body 102 and the body insert 118 for providing the buoyancy chamber 134. As such, the sealing structure 132 can be implemented in a variety of different manners. It is disclosed herein that the seal structure 132 can be a discrete seal structure such as, for example, a gasket, an O-ring, or the like. It is also disclosed herein that the seal structure 132 can be implemented as an adhesive bond seal, a thermally-created seal, of the like provided at a physical interface between the container body 102 and the body insert 118. Preferably, but not necessarily, the seal structure 132 is between the upper end portion 120 of the body insert 118 and the open upper end portion 104 of the container body 102. The container body 102 and/or the body insert 118 can include a protrusion 135 (e.g., a flange or ledge) with which the sealing structure 132 is engaged (e.g., one which O-ring or gasket rests) or through which the sealing structure 132 is formed (e.g., through which an adhesive bond seal or a thermally-created seal is formed).

A cover 136 is moveably attached to the container body 102, the body insert 118 of both. The cover 136 is moveably attached in a manner allowing the cover 136 to be moved between a position covering the cavity (i.e., closed position C) and a position allowing access into the cavity 104 (i.e., open position O). Preferably, but not necessarily, the cover 136 is pivotably attached to the container body 102 by one or more hinge structures 138 coupled between the container body 102 and the cover 136. The cover 136 and container body 102 can include a fixture structure (e.g., clips 140 and tables 142) jointly configured for allowing the cover 136 to be selectively secured in the closed position C. The cover 136 can include a seal engaging protrusion 133 that urges the seal 132 into engagement with the protrusion 135 when the cover 136 is in the position covering the cavity of the container body 102.

Preferably, but not necessarily, the container body 102, the cover 136, and the seal structure 132 are jointly configured for providing a water-resistance seal between the cover 136 and container body 102 when the cover 136 is in the closed position C. For example, in one embodiment (e.g., depicted in FIG. 6), the sealing structure 132 is a resilient gasket or O-ring exposed at the upper edge of the container body 102. In such an embodiment, the cover 136 can include a sealing member 144 that engages the resilient gasket or O-ring when the cover 136 is in the closed position C.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A container, comprising:
 a container body having a cavity therein defined by a closed lower end portion thereof and an open upper end portion thereof;
 a body insert within the cavity, wherein at least a portion of a bottom wall of the body insert is spaced away from an interior surface of the container body defining the closed lower end portion thereof;
 a seal structure between the body insert and the container body such that a sealed gas chamber is defined within the cavity between the container body and the body insert; and
 a cover movably attached to at least one of the container body and the body insert in a manner allowing the cover to be moved between a position covering the cavity and a position allowing access into the cavity;
 wherein the seal structure is simultaneously engaged between the body insert and the container body and with the cover when the cover is in the position covering the cavity and remains engaged between the body insert and the container body when the cover is in the position allowing access into the cavity; wherein at least one of the container body and the body insert includes a seal supporting structural element for engaging the seal structure to limit displacement of the seal structure in a direction away from the open upper end portion of the container body when the seal structure is engaged by the cover; and
 wherein the cover includes a seal engaging protrusion that urges the seal structure into engagement with the seal supporting structural element when the cover is in position covering the cavity.

2. The container of claim 1 wherein an upper end portion of the body insert is adjacent the open upper end portion of the container body.

3. The container of claim 1 wherein the seal structure is between an upper end portion of the body insert and the open upper end portion of the container body.

4. The container of claim 3 wherein an upper edge of the body insert is substantially flush with an upper edge of the container body; and a buoyancy providing substance within the sealed gas chamber consists entirely of air.

5. The container of claim 4 wherein the seal structure is selected from the group consisting of a gasket and an O-ring seal.

6. The container of claim 1 wherein the seal structure is selected from the group consisting of a gasket, an adhesive bond seal, a thermally-created seal, and an O-ring seal.

7. The container of claim 1 wherein the body insert has a standoff structure extending toward the closed lower end portion of the container body.

8. The container of claim 7 wherein:
 the seal structure is between the upper end portion of the body insert and the open upper end portion of the container body; and
 the seal structure is selected from the group consisting of a gasket, an adhesive bond seal, a thermally-created seal, and an O-ring seal.

9. A fishing tackle box, comprising:
 a container body having a cavity therein defined by a closed lower end portion thereof and an open upper end portion thereof, wherein the container body includes at least one attachment structure integral with an exterior surface thereof;
 a body insert within the cavity, wherein the body insert has a compartment structure and a standoff structure, wherein an upper end portion of the compartment structure is adjacent the open upper end portion of the container body, wherein the standoff structure extends from the compartment structure toward the closed lower end portion of the container body, and wherein the compartment structure includes a plurality of compartments accessible through the open upper end portion of the container body;
 a seal structure between the compartment structure and the container body such that a sealed gas chamber is defined within the cavity between the container body and the body insert; and
 a cover moveably attached to at least one of the container body and the body insert in a manner allowing the cover to be moved between a position covering the cavity and a position allowing access into the cavity;
 wherein the seal structure is simultaneously engaged between the body insert and the container body and with the cover when the cover is in the position covering the cavity and remains engaged between the body insert and the container body when the cover is in the position allowing access into the cavity;
 wherein at least one the container body and the body insert includes a seal supporting structural element for engaging the seal to limit displacement of the seal in a direction away from the upper end portion of the container body when the seal is engaged by the cover; and
 wherein the cover includes a seal engaging protrusion that urges the seal into engagement with the seal supporting structural element when the cover is in the position covering the cavity.

10. The fishing tackle box of claim 9 wherein:
 the seal structure is between an upper end portion of the body insert and the open upper end portion of the container body; and a buoyancy providing substance within the sealed gas chamber consists entirely of air.

11. The fishing tackle box of claim 10 wherein the seal structure is selected from the group consisting of a gasket, and an O-ring seal.

12. The fishing tackle box of claim 11 wherein the container body, the cover, and the seal structure are jointly configured for providing a water-resistance seal between the cover and container body when the cover is in the position covering the cavity.

13. The fishing tackle box of claim 9 wherein the seal structure is selected from the group consisting of a gasket and an O-ring seal.

14. The fishing tackle box of claim 9 wherein the container body, the cover, and the seal structure are jointly configured for providing a water-resistance seal between the cover and container body when the cover is in the position covering the cavity.

15. The fishing tackle box of claim 14 wherein the seal structure is selected from the group consisting of a gasket and an O-ring seal.

16. A method of making a container, comprising:
   positioning a body insert within a cavity of a container body, wherein the cavity is defined by a closed lower end portion of the container body and an open upper end portion of the container body and wherein the container body has at least one strap attachment structure integral with an exterior surface thereof;
   providing a seal structure between the body insert and the container body such that a sealed gas chamber is defined within the cavity between the container body and the body insert, wherein a buoyancy providing substance within the sealed gas chamber consists entirely of air; and
   movably attaching a cover to at least one of the container body and the body insert in a manner allowing the cover to be moved between a position covering the cavity and a position allowing access into the cavity, wherein the cover engages the seal structure when in the position covering the cavity; wherein the seal structure is simultaneously engaged between the body insert and the container body and with the cover when the cover is in the position covering the cavity and remains engaged between the body insert and the container body when the cover is in the position allowing access into the cavity;
   wherein at least one of the container body and the body insert includes a seal supporting structural element for engaging the seal structure to limit displacement of the seal structure in a direction away from the open upper end portion of the container body when the seal structure is engaged by the cover; and
   wherein the cover includes a seal engaging protrusion that urges the seal structure into engagement with the seal supporting structural element when the cover is in position covering the cavity.

17. The method of claim 16 wherein:
   the body insert has a compartment structure and a standoff structure;
   the compartment structure includes a plurality of compartments on a first side of a bottom wall of the compartment structure;
   the standoff structure extends away from a second side of the bottom wall of the compartment structure; and
   positioning the body insert within the cavity is performed such that an upper end portion of the compartment structure is adjacent the open upper end portion of the container body and such that the standoff structure extends from the compartment structure toward the closed lower end portion of the container body.

18. The method of claim 17 wherein providing the seal structure is performed between an upper end portion of the compartment structure and the open upper end portion of the container body.

19. The method of claim 16 wherein:
   providing the seal structure includes forming a seal in a manner selected from the group consisting of providing a gasket between the container body and the body insert, forming an adhesive bond seal between the container body and the body insert, forming a thermally-created seal between the container body and the body insert, and providing an O-ring seal between the container body and the body insert.

20. The method of claim 16 wherein providing the seal structure include providing the seal structure in a manner for providing a water-resistance seal between the cover and container body when the cover is in the position covering the cavity.

* * * * *